Dec. 30, 1930.  A. D. GARGOLINSKI  1,786,708
CLUTCH
Filed May 11, 1929

INVENTOR
ANTHONY D. GARGOLINSKI
ATTORNEYS

Patented Dec. 30, 1930

1,786,708

UNITED STATES PATENT OFFICE

ANTHONY D. GARGOLINSKI, OF WORCESTER, MASSACHUSETTS, ASSIGNOR TO CROMPTON & KNOWLES LOOM WORKS, OF WORCESTER, MASSACHUSETTS, A CORPORATION OF MASSACHUSETTS

CLUTCH

Application filed May 11, 1929. Serial No. 362,355.

This invention relates to a clutch and it is the general object of the invention to provide means to require the clutch elements, once disengaged, to undergo a relative angular movement of 720° before the elements can be again moved to operative position.

The invention is more particularly usable on, though not limited to, the upright shaft of a so-called Knowles loom. In that type of loom the harnesses and shifting boxes are actuated by power transmitted through an upright shaft. When the loom has a magazine on one end thereof with a single shuttle box under the magazine and shifting shuttle boxes on the opposite end, it is important to prevent a change of the boxes when the active shuttle is in the single box under the magazine. If this were not done it would be possible to get the active shuttle back into the wrong cell of the shifting shuttle boxes. A device for preventing such an occurrence and insuring the correct timing of the shaft with respect to the loom is shown in prior Patent No. 1,565,639 to Gordon. It is an important object of my present invention to provide a clutch which will accomplish the general results set forth in the Gordon patent but with simpler mechanism.

It is a further object of my invention to provide a clutch mechanism having driving and driven elements and a coupling device for said elements the movements of which are determined by a controller movable preferably radially with respect to the axis of the clutch and angularly with one of the elements thereof.

It is a more specific object of my invention to provide driving and driven clutch elements in one of which is formed a groove or track cam to receive a movable controller, the groove or track cam being so formed that two complete revolutions of one element are necessary with respect to the other element before the controller will permit engagement of the elements.

With these and other objects in view which will appear as the description proceeds, my invention resides in the combination and arrangement of parts hereinafter described and set forth in the claims.

Figure 1:
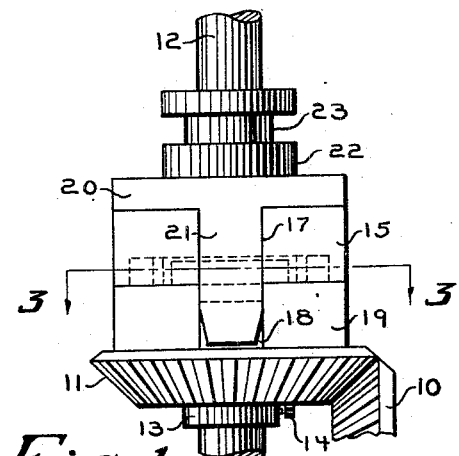
Figure 2:
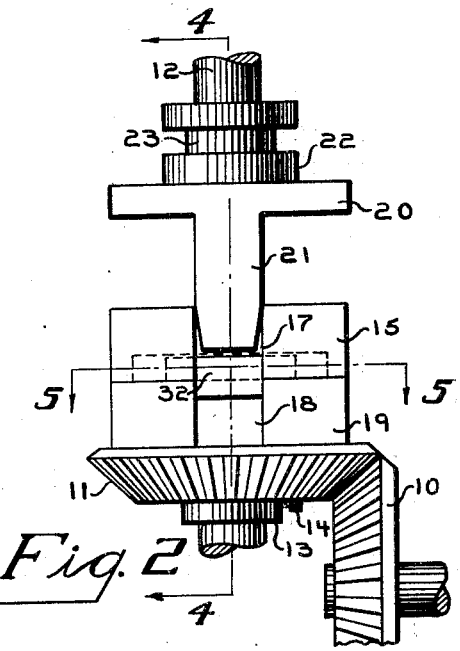
Figure 4:
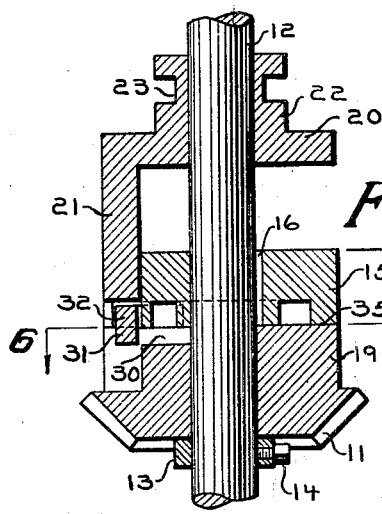
Figure 3:
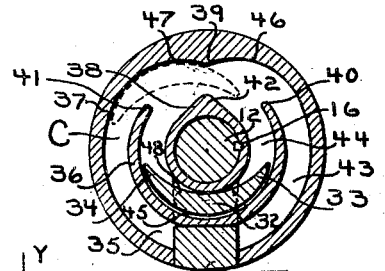
Figure 8:
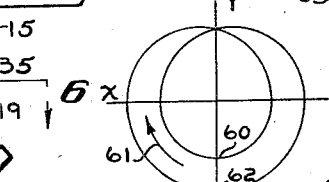
Figures 5, 6, 7:
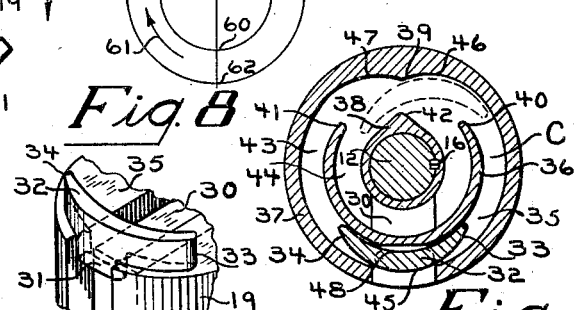

In the accompanying drawings wherein I have shown a convenient embodiment of my invention, Fig. 1 is an elevation of my improved clutch showing the driving and driven members connected together by the coupling, Fig. 2 is a view similar to Fig. 1 but with the key removed and prevented from moving to driving position by my improved controller, Fig. 3 is a horizontal section on line 3—3 of Fig. 1, Fig. 4 is a vertical section on line 4—4 of Fig. 2, Fig. 5 is a horizontal section on line 5—5 of Fig. 2, Fig. 6 is a horizontal section on line 6—6 of Fig. 4, Fig. 7 is a detailed perspective view with parts removed showing the manner in which the controller is related to one of the driving elements, and Fig. 8 is a diagrammatic view showing the center line of the groove or cam slot with respect to which the controller moves.

Referring to the drawings, I have shown a driving bevel gear 10 which moves constantly during loom operation and meshes with a second bevel gear 11 constituting the driving element of my clutch. The gear 11 rotates free around an upright shaft 12 and is held against moving downwardly by means of a collar 13 held in position on the shaft by means of a set screw 14.

The driven member of the clutch indicated at 15 is keyed as at 16 to the shaft 12 and has therein a vertical slot 17 which is adapted in certain angular positions of the driving and driven elements to be in alignment with another slot 18 formed in the hub 19 of the driving gear 11.

A coupling or key member 20 has a tongue 21 which moves in the slots 17 and 18. This coupling member is provided with a hub 22 having a groove 23 to receive the fingers not shown of a lifting lever. The coupling member is free to slide vertically along the shaft 12.

When applying the clutch of the form described to a weft replenishing loom it is desirable to prevent the tongue 21 from operatively connecting the driving and driven elements when the active shuttle is on the single box end of the loom. It is to be understood that the shaft 12 makes a complete revolution each pick of the loom and therefore makes two complete revolutions for the movement of the active shuttle from the drop box to the plain end and back again to the drop box end of the loom, it being understood that each flight of the shuttle across the loom corresponds to a pick. With the active shuttle in the drop or shifting boxes, therefore, at any particular cycle in the pick of the loom, the tongue 21 will be in a predetermined angular position with respect to the shaft 12. On the next pick when the active shuttle is in the plain or single box end of the loom and at the same predetermined time the tongue will be in the same angular relation relatively to the shaft, but it will be necessary to prevent said tongue under these conditions from moving to driving position The matter thus far described is of common construction in the upright shafts of so-called Knowles looms and forms no part of my present invention.

In carrying my invention into effect I provide the hub 19 with a horizontal upwardly opening slot 30 into which extends a lug 31 formed on a controller 32 which as shown herein is in crescent form. The right and left hand ends of the controller 33 and 34, respectively, as viewed in Fig. 5, extend beyond the slot 30 to support said controller and rest on the upper surface 35 of the hub 19.

As shown in Figs. 3 and 5 the driven element 15 which is keyed to the shaft 12 is provided with a groove or track cam designated generally at C. The element 15 is provided with a depending arcuate web 36 which is not formed in a complete circle but has one portion thereof broken away as suggested in Figs. 3 and 5. This web 36 lies intermediate the outer wall 37 and the hub portion 38 of the element 15. The wall 37 is provided with a blunt inwardly extending point 39 approximately centrally located with respect to the right and left hand ends 40 and 41, respectively, of the web 36. The hub portion 38 is also provided with a pointed projection 42 which is preferably in radial alignment with the point 39 relatively to the axis of the shaft 12. The web 36 lies in such a position as to define an outer groove 43 with the wall 37 and an inner groove 44 with the hub portion 38.

As shown in Figs. 3 and 5 the outer or convex face 45 of the controller is so formed as to be substantially concentric with the portions 46 and 47 of the wall 37 which are located at the right and left, respectively, of the point 39. This relation is not necessary but I find it to be desirable. The inner or concave surface 48 of the crescent-shaped controller is so formed as to move without interference with the point 42 when the controller is passing from one groove to the other.

During normal operation the tongue 21 of the coupling member lies in both slots 17 and 18 and all of the parts mounted on shaft 12 will rotate as a unit. Inasmuch as there is no relative angular movement between the elements of the clutch the controller 32 will lie in the position shown in Fig. 3. If it be desired to make a pick-out because of a mispick in the cloth it will be necessary to disconnect the shaft 12 from the driving mechanism of the loom in order to move the pattern chain to operate the harnesses. This result is accomplished by lifting the connecting member 20 from the position shown in Fig. 1 to that shown in Fig. 2 by means of the previously described but not shown fingers or lever. By means of other mechanism not shown but well understood in the art of weaving the shaft 12 is then moved by a hand wheel, not shown, the gear 10 being held against rotation because of the fact that the loom is at rest and the bevel gear 11 therefore also remaining stationary. The driven member 15, however, being keyed to the shaft 12 rotates with the latter but during this rotation the controller 32 is held against angular movement with respect to the bevel gear 11 by reason of the fact that the lug 31 extends into the slot 30 in the hub of said gear 11. In other words during the manual rotation of the shaft 12 and driven element 15 the controller can move only in a radial direction with respect to the axis of the shaft 12.

When the shaft 12 is rotated the controller 32 will leave the inner groove 44 and enter the outer groove 43 by engagement with either the surface 46 or surface 47, depending upon the direction of rotation. The point 42 will engage the concave face of the crescent controller to prevent the latter from remaining in the inner groove.

After the controller has entered the outer groove it will remain in a position to be under the tongue 21 when the latter arrives at the angular position where the hand rotation of the shaft 12 started. At the end of the first complete revolution, therefore, the controller will be under the coupling member and the loom will be in a position such that under normal conditions the active shuttle would be on the plain or magazine end of the loom. The clutch cannot under these conditions be connected with the loom and the weaver will be required to make another revolution of the shaft 12. In doing so the controller will move from the outer groove 43 past the point 39 into the inner groove 44 and at the end of the second revolution the controller will be in the inner groove or out of vertical alignment with the tongue 21 and the latter will therefore be free to move downwardly to establish driving connections between the clutch elements.

In Fig. 8 is shown the center line of the double groove. The vertical and horizontal axes Y and X, respectively, pass through the axis of shaft 12. As the groove rotates in the direction of arrow 61 the controller will move along the vertical axis Y from point 60 to point 62. The controller arrives at point 62 at the end of one complete rotation of the element 15. During the next rotation of the groove the controller will move back to point 60. From this it will be seen that the controller must pass around the shaft twice before arriving at the point 60. The center line of the groove or cam slot shown in Fig. 8 is substantially a limaçon, although I do not wish to be limited to a curve which is strictly of this type.

From the foregoing it will be seen that I have provided a clutch so constructed that two complete revolutions of one of the clutch elements is necessary with respect to the other before the coupling member can operatively connect the clutch elements. It will also be seen that the points 39 and 42 assist in deflecting the controller 32 as the same passes from one of the grooves to the other. By referring to Fig. 8 it will be seen that the center line of the cam groove is formed of two loops one within the other and the center of the clutch passing through both loops.

Having thus described my invention it will be seen that changes and modifications may be made therein by those skilled in the art without departing from the spirit and scope of the invention and I do not wish to be limited to the details herein disclosed, but what I claim is:

1. In a clutch mechanism, a shaft to be rotated, a driven clutch element secured to the shaft, a driving element, a coupling member movable to driving position to operatively connect the elements and movable also to non-driving position to operatively disconnect said elements, said elements capable of relative angular movement when the elements are operatively disconnected, a controller for the coupling member movable radially and peripherally with respect to the shaft out of and into the path of the coupling member, and means to cause radial movement of the controller when the elements move angularly relatively to each other.

2. In a clutch mechanism, a shaft to be rotated, a driven clutch element secured to the shaft, a driving element, a coupling member movable to driving position to operatively connect the elements and movable also to non-driving position to operatively disconnect said elements, said elements capable of relative angular movement when the elements are operatively disconnected, a controller movable radially of the shaft into the path of the coupling member to prevent cooperation of the elements and movable radially and peripherally of the shaft out of the path of the member to permit the coupling to move to operatively connect the elements, and means to move the controller radially of the shaft and transversely of the path of movement of the coupling member as the elements move relatively to each other.

3. In a clutch mechanism, a shaft to be rotated, a driven clutch element secured to the shaft, a driving element, a coupling member movable to driving position to operatively connect the elements and movable also to non-driving position to operatively disconnect said elements, said elements capable of relative angular movement when the elements are operatively disconnected, a controller movable peripherally of and toward the shaft out of the path of the coupling to permit the latter to operatively connect the elements and said controller being movable peripherally of and away from the shaft into the path of the coupling to prevent the latter from operatively connecting the elements, means to prevent relative angular movement of the controller and one element, and means carried by the other element to cause the controller to move toward and from the shaft when the elements move angularly relatively to each other.

4. In a clutch mechanism, a shaft to be rotated, a driven clutch element secured to the shaft, a driving element, a coupling member movable to driving position to operatively connect the elements and movable to non-driving position to operatively disconnect said elements, said elements capable of relative angular movement when the elements are operatively disconnected, a controller movable radially and peripherally of the shaft, being movable in one direction out of the path of the coupling member to permit the latter to move to establish operative connection between the elements, and said controller being movable in the other direction into the path of movement of the coupling member to prevent the latter from establishing operative connections between the elements, and means dependent upon relative angular movement of the elements and operative to move the controller.

5. In a clutch mechanism, a shaft to be rotated, a driven clutch element secured to the shaft, a driving element, a coupling member movable to driving position to operatively connect the elements and movable also to non-driving position to operatively disconnect said elements, said elements capable of relative angular movement when the elements are operatively disconnected, a controller movable radially and peripherally of the shaft, being movable in one direction out of the path of the coupling to permit the latter to move to establish operative connection between the elements, and said controller being movable in the other direction into the path of movement of the coupling to prevent the latter from establishing operative connections between the elements, means to cause the coupling to move with one element, and means moving with the other element to cause the controller to move when the elements move angularly relatively to each other.

6. In a clutch mechanism, a shaft to be rotated, a driven clutch element secured to the shaft, a driving element, a coupling member movable to driving position to operatively connect the elements and movable also to non-driving position to operatively disconnect said elements, said elements capable of relative angular movement when the elements are operatively disconnected, a controller movable radially and peripherally of the shaft, being movable in one direction out of the path of the coupling member to permit the latter to move to establish operative connection between the elements, and said controller being movable in the other direction into the path of movement of the coupling member to prevent the latter from establishing operative connections between the elements, means to cause the controller to move with one of the elements and guide the controller, and means moving with the other element to cause the controller to move when the elements move relatively to each other.

7. In a clutch mechanism, a shaft to be rotated, a driven clutch element secured to the shaft, a driving element, a coupling member movable to driving position to operatively connect the elements and movable also to non-driving position to operatively disconnect said elements, said elements capable of relative angular movement when the elements are operatively disconnected, means moving with one of the elements to define two cam grooves which intersect, a controller for the coupling member movable in the grooves, and means moving with the other element to prevent said controller from moving angularly with respect to said other element, said controller moving from one groove to the other and passing through the intersection of the grooves, the controller when in one groove preventing the coupling member from connecting the elements and when in the other groove being out of the path of the coupling member.

8. In a clutch mechanism, a shaft to be rotated, a driven clutch element secured to the shaft, a driving element, a coupling member movable to driving position to operatively connect the elements and movable also to non-driving position to operatively disconnect said elements, said elements capable of relative angular movement when the elements are operatively disconnected, a controller movable along a line extending toward and from the shaft, being movable in one direction out of the path of the coupling member to permit the latter to move to establish operative connection between the elements, and said controller being movable along the said line in the other direction into the path of movement of the coupling member to prevent the latter from establishing operative connections between the elements, means moving with one of the elements to define two cam grooves which intersect each other, a controller movable in the cam grooves, and means carried by the other element to require the controller to move around the axis of the clutch as one of said elements rotates, said cam grooves being so formed as to require two complete revolutions of one of the elements to restore the controller to normal position, said controller at the end of the first complete revolution lying in the path of the coupling member.

9. In a clutch mechanism, a shaft to be rotated, a driven clutch element secured to the shaft, a driving element, a coupling member movable to driving position to operatively connect the elements and movable also to non-driving position to operatively disconnect said elements, said elements capable of relative angular movement when the elements are operatively disconnected, one of the elements having two grooves, portions of which are substantially concentric and other portions of which intersect, a controller located in one of said grooves normally in one of the concentric portions thereof, and means operative during relative rotation of the elements to cause said controller to move from one groove through the point of intersection to the other groove during one revolution of an element to lie in the path of movement of the coupling member, said means acting to cause the controller to move from said other groove through the points of intersection back to the first groove during the second revolution of the element to restore the controller to normal position where it is out of the path of the coupling member.

10. In a clutch mechanism, a shaft to be rotated, a driven clutch element secured to the shaft, a driving element, a coupling member movable to driving position to operatively connect the elements and movable also to non-driving position to operatively disconnect said elements, said elements capable of relative angular movement when the elements are operatively disconnected, a controller for the coupling member, means defining a path to guide said controller, the path being substantially similar to a limaçon, said controller in normal position being in a portion of the path out of controlling position with respect to the coupling member, and means to move the controller to another part of the path after a complete revolution of one of the elements with respect to the other element, said controller when in the other part of the path preventing the coupling member from connecting the elements together.

11. In a clutch mechanism, a shaft to be rotated, a driven clutch element secured to the shaft, a driving element, a coupling member movable to driving position to operatively connect the elements and movable also to non-driving position to operatively disconnect said elements, said elements capable of relative angular movement when the elements are operatively disconnected, the driving element having a radial slot and an upper surface through which the slot extends, the driven element having formed therein a groove formed on two portions parts of which are substantially concentric and parts of which intersect, and a controller resting on the upper surface of the lower element and having a part to extend into the slot, said controller extending into the groove in the upper element, said upper element being movable angularly with respect to the lower element, the controller being movable in a direction parallel to the slot in the lower member and being guided in the groove in the upper element, said controller when in one of the concentric parts of the groove being out of the path of the coupling member and when in the other of the concentric parts of the groove being in the path of the coupling member to prevent the latter from operatively connecting the elements.

12. In a clutch mechanism, a shaft to be rotated, a driven clutch element secured to the shaft, a driving element, a coupling member movable to driving position to operatively connect the elements and movable also to non-driving position to operatively disconnect said elements, said elements capable of relative angular movement when the elements are operatively disconnected, one of said elements being movable around the axis of the clutch while the other element remains at rest, a controller for the coupling member normally out of the path of the coupling member and having engagement with the element which remains at rest while the other element rotates, the other element being formed with a cam groove to receive the controller, the groove being so formed as to move the controller in the path of the coupling member after a complete revolution of said movable element and requiring two complete revolutions of the element associated therewith before the controller will be returned to normal position.

13. In a clutch mechanism, a shaft to be rotated, a driven clutch element secured to the shaft, a driving element, a coupling member movable to driving position to operatively connect the elements and movable also to non-driving position to operatively disconnect said elements, said elements capable of relative angular movement when the elements are operatively disconnected, a controller for the coupling member located between the elements, and means to cause the coupling controller to move toward and from the axis of the clutch and peripherally thereof when one of said elements rotates with respect to the other element, two complete revolutions of one of the elements with respect to the other being necessary to restore the controller to normal position, said controller at the completion of the first revolution lying in the path of the coupling member to prevent the latter from connecting operatively the elements of the clutch.

14. In a clutch, a driving element, a driven element, a coupling member to connect the elements together operatively and movable to disconnect said elements, means on one element defining a cam groove having two loops, one within the other and through both of which the axis of the clutch passes, a controller for the coupling member between the elements and having a part located in the groove, and connections between the other element and the controller to cause the latter to move relatively to the coupling member, the controller being normally out of engaging position relatively to the coupling member and movable into engaging position after a complete revolution of one element relatively to the other, said controller being moved back to normal position after two complete revolutions of one element relatively to the other.

In testimony whereof I have hereunto affixed my signature.

ANTHONY D. GARGOLINSKI.